US011209873B2

United States Patent
Castro et al.

(10) Patent No.: US 11,209,873 B2
(45) Date of Patent: Dec. 28, 2021

(54) DROP PROTECTION FOR DISPLAY ASSISTANT DEVICE

(71) Applicant: GOOGLE LLC, Mountain View, CA (US)

(72) Inventors: James Castro, San Jose, CA (US); Carl Cepress, Los Altos, CA (US); Chih-Min Chien, Taipei (TW); Liang Cheng, Fremont, CA (US); Justin Leong, Milpitas, CA (US); Xiaoping Qin, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/596,711

(22) Filed: Oct. 8, 2019

(65) Prior Publication Data

US 2020/0110441 A1    Apr. 9, 2020

Related U.S. Application Data

(63) Continuation of application No. PCT/US2018/064452, filed on Dec. 7, 2018.
(Continued)

(51) Int. Cl.
*G06F 1/16* (2006.01)
*G06F 3/16* (2006.01)
(Continued)

(52) U.S. Cl.
CPC ........ *G06F 1/166* (2013.01); *G02F 1/133308* (2013.01); *G02F 1/133753* (2013.01);
(Continued)

(58) Field of Classification Search
CPC ...... G06F 1/166; G06F 1/1605; G06F 1/1658; G06F 1/1626; G06F 1/1637; G06F 3/167;
(Continued)

(56) References Cited

U.S. PATENT DOCUMENTS 6,411,271 B1    6/2002  Bangil-Soon
6,437,238 B1 *  8/2002  Annerino .............. G06F 1/1626
                                                        174/50
(Continued)

FOREIGN PATENT DOCUMENTS

CN      107454513       12/2017
EP       0303912         2/1989
(Continued)

OTHER PUBLICATIONS

Burns, Chris, "Google Home Hub Leaked: The new do-all screen", Slashgear, Sep. 18, 2018, https://www.slashgear.com/google-home-hub-release-details-date-images-smart-screen-18546222/ (Year: 2018).*
(Continued)

*Primary Examiner* — Abhishek M Rathod
(74) *Attorney, Agent, or Firm* — Colby Nipper PLLC

(57) ABSTRACT

In a display assistant device, a display panel assembly has a plurality of first retention elements, and each first retention element is formed on a rear surface of the display panel assembly and adjacent to a respective first edge of the display panel assembly. A back cover is configured to hold the display panel assembly using a plurality of second retention elements. Each second retention element is arranged adjacent to a respective second edge of the back cover. When mated to each other, the first and second retention elements are configured to control an in-plane displacement of each second edge of the back cover in response to an impact of a force on the second edges, thereby limiting an out-of-plane displacement of each second edge of the back cover and protecting the first edges of the display panel assembly from falling apart from the second edges of the back cover.

20 Claims, 9 Drawing Sheets

Related U.S. Application Data

(60) Provisional application No. 62/742,892, filed on Oct. 8, 2018, provisional application No. 62/742,888, filed on Oct. 8, 2018, provisional application No. 62/743,464, filed on Oct. 9, 2018.

(51) Int. Cl.
| | |
|---|---|
| *G02F 1/1333* | (2006.01) |
| *G02F 1/1337* | (2006.01) |
| *G10L 15/28* | (2013.01) |
| *G06F 21/83* | (2013.01) |
| *H04R 1/02* | (2006.01) |
| *H04R 1/34* | (2006.01) |
| *H04L 12/28* | (2006.01) |

(52) U.S. Cl.
CPC .......... *G06F 1/1605* (2013.01); *G06F 1/1626* (2013.01); *G06F 1/1637* (2013.01); *G06F 1/1658* (2013.01); *G06F 1/1683* (2013.01); *G06F 1/1686* (2013.01); *G06F 1/1688* (2013.01); *G06F 1/1698* (2013.01); *G06F 3/167* (2013.01); *G06F 21/83* (2013.01); *G10L 15/28* (2013.01); *H04R 1/023* (2013.01); *H04R 1/025* (2013.01); *H04R 1/028* (2013.01); *H04R 1/345* (2013.01); *G02F 1/133325* (2021.01); *G02F 1/133761* (2021.01); *H04L 12/282* (2013.01); *H04R 2499/15* (2013.01)

(58) Field of Classification Search
CPC .... G06F 1/1683; G06F 1/1686; G06F 1/1688; G06F 1/1698; G06F 21/83; G06F 1/16; G06F 21/6245; G06F 1/1671; G06F 1/203; G06F 1/1656; G06F 3/162; H04R 1/023; H04R 1/028; H04R 1/345; H04R 1/025; H04R 2499/15; H04R 1/02; H04R 27/00; H04R 2227/003; H04R 2227/005; H04R 1/026; H04R 2200/1631; H04R 1/34; H04R 1/021; G02F 1/133308; G02F 1/133753; G02F 1/133325; G02F 1/133761; G10L 15/28; G10L 15/22; H04L 12/282; H04N 7/14; H04N 21/4223; H04N 21/43615; G08C 23/02
See application file for complete search history.

(56) References Cited

U.S. PATENT DOCUMENTS

| | | | |
|---|---|---|---|
| 7,576,983 B2 | 8/2009 | Yamaguchi et al. | |
| 8,528,690 B1 | 9/2013 | Wu | |
| 9,064,386 B2 | 6/2015 | Won et al. | |
| 9,641,920 B1 | 5/2017 | Jones, II | |
| D789,362 S * | 6/2017 | Eljas | D14/366 |
| D811,383 S | 2/2018 | Diasabeygunawardena et al. | |
| 10,484,770 B1 | 11/2019 | Rao et al. | |
| D873,815 S * | 1/2020 | McWilliam | D14/314 |
| 10,996,717 B2 | 5/2021 | Castro et al. | |
| 2006/0008103 A1 | 1/2006 | Takahashi et al. | |
| 2008/0165485 A1* | 7/2008 | Zadesky | H04M 1/0252 361/679.02 |
| 2010/0146766 A1* | 6/2010 | Dabov | H04M 1/026 29/428 |
| 2010/0205667 A1 | 8/2010 | Anderson | |
| 2010/0272307 A1 | 10/2010 | Okumura | |
| 2013/0082984 A1 | 4/2013 | Drzaic et al. | |
| 2013/0098854 A1* | 4/2013 | Lee | F16M 11/105 211/26 |
| 2013/0235420 A1 | 9/2013 | Nihashi et al. | |
| 2013/0279730 A1 | 10/2013 | Tanaka | |
| 2013/0282499 A1 | 10/2013 | Kato | |
| 2014/0268578 A1 | 9/2014 | Dolci et al. | |
| 2014/0376758 A1 | 12/2014 | Barcel et al. | |
| 2015/0049894 A1 | 2/2015 | Ditullo et al. | |
| 2015/0053497 A1 | 2/2015 | Horiuchi | |
| 2015/0185768 A1* | 7/2015 | Voege | G07G 1/12 361/679.3 |
| 2015/0195635 A1 | 7/2015 | Garfio et al. | |
| 2015/0278499 A1 | 10/2015 | Levitov | |
| 2015/0373440 A1 | 12/2015 | Fontana | |
| 2016/0139702 A1 | 5/2016 | Franklin et al. | |
| 2017/0006715 A1* | 1/2017 | Choi | H04M 1/0249 |
| 2017/0258191 A1* | 9/2017 | Poon | A45C 13/008 |
| 2017/0278361 A1* | 9/2017 | Fujimoto | G07G 1/12 |
| 2017/0300893 A1 | 10/2017 | Sasaki et al. | |
| 2018/0174584 A1 | 6/2018 | Chih et al. | |
| 2018/0190285 A1 | 7/2018 | Heckman et al. | |
| 2018/0199123 A1 | 7/2018 | Rao et al. | |
| 2019/0114880 A1 | 4/2019 | Hanes | |
| 2019/0181533 A1 | 6/2019 | Gummalla et al. | |
| 2019/0212274 A1 | 7/2019 | Pai et al. | |
| 2019/0212274 A1* | 7/2019 | Patterson | G06F 1/16 |
| 2020/0090662 A1 | 3/2020 | Castro et al. | |
| 2020/0112786 A1 | 4/2020 | Castro et al. | |
| 2021/0011518 A1 | 1/2021 | Zin et al. | |
| 2021/0191456 A1 | 6/2021 | Castro et al. | |

FOREIGN PATENT DOCUMENTS

| | | |
|---|---|---|
| EP | 3122022 A2 | 1/2017 |
| JP | 2007259262 | 4/2007 |
| JP | 2008211381 A | 9/2008 |
| JP | 2009038446 A | 2/2009 |
| JP | 2014131243 A | 7/2014 |
| JP | 2018121168 A | 8/2018 |
| TW | 201131335 A | 9/2011 |
| WO | 2016198559 | 12/2016 |
| WO | WO 2018/139462 A1 | 8/2018 |

OTHER PUBLICATIONS

Awad Ballaith, "[Exclusive] Google Home Hub To Be Launched On Oct. 9; A Smart Speaker with 7-inch Display", Myspartprice, Sep. 18, 2018, https://web.archive.org/web/20180918191325/https://www.mysmartprice.com/gear/google-home-hub/ (Year: 2018).*

"Archos Hello Activates AI, Displays and Manages Anything, Anywhere at home, just by Asking", http://www.archos.com/corporate/press/press_releases/EN_20180828_ARCHOS_IFA_Next_2018_ARCHOS_Hello.pdf, Aug. 28, 2018, 6 pages.

"International Search Report and Written Opinion", Application No. PCT/US2019/028959, dated Jul. 24, 2019, 15 pages.

"International Search Report and Written Opinion", Application No. PCT/US2019/028601, dated Dec. 20, 2019, 18 pages.

"Non-Final Office Action", U.S. Appl. No. 16/597,745, filed Nov. 25, 2020, 9 pages.

"Notice of Allowance", U.S. Appl. No. 16/597,745, filed Jan. 25, 2021, 8 pages.

"Pre-Interview First Office Action", U.S. Appl. No. 16/525,360, filed Jul. 2, 2020, 3 pages.

"We took apart the Google Home Hub and the Amazon Echo Show 2 | Cracking Open", https://www.youtube.com/watch?v=9vo7PtXlzCk, Jan. 27, 2019, 1 page.

I-Home Technology Co et al., "Lynky: Touchscreen Smart Hub with Google Assistant", Feb. 24, 2018, 13 pgs.

Google, International Search Report/Written Opinion, PCT/US2018/064452, dated Jun. 24, 2019, 12 pgs.

Google, International Search Report/Written Opinion, PCT/US2018/064536, dated Jun. 28, 2019, 12 pgs.

Google, International Search Report/Written Opinion, PCT/US2018/064449, dated Aug. 28, 2019, 21 pgs.

"Non-Final Office Action", U.S. Appl. No. 16/525,360, filed Aug. 6, 2021, 18 pages.

"Final Office Action", U.S. Appl. No. 16/525,360, filed Apr. 30, 2021, 16 pages.

"International Preliminary Report on Patentability", Application No. PCT/US2018/064449, dated Mar. 23, 2021, 16 pages.

(56) References Cited

OTHER PUBLICATIONS

"International Preliminary Report on Patentability", Application No. PCT/US2019/028959, dated Apr. 8, 2021, 10 pages.
"International Preliminary Report on Patentability", Application No. PCT/US2019/028601, dated Apr. 8, 2021, 14 pages.
"International Preliminary Report on Patentability", Application No. PCT/US2018/064536, dated Apr. 8, 2021, 9 pages.
"Internationanl Preliminary Report on Patentability", Application No. PCT/US2018/064452, dated Apr. 8, 2021, 10 pages.
"Notice of Allowance", U.S. Appl. No. 16/597,745, filed Mar. 31, 2021, 8 pages.
"Foreign Office Action", EP Application No. 19728777.4, dated Oct. 14, 2021, 6 pages.

* cited by examiner

DROP PROTECTION FOR DISPLAY ASSISTANT DEVICE

RELATED APPLICATIONS

This application claims priority to and is a continuation application of International Application No. PCT/US2018/064452, filed Dec. 7, 2018, titled "Drop Protection for Display Assistant Device," which claims priority to the following applications, each of which is incorporated by reference in its entirety:

U.S. Provisional Patent Application No. 62/742,892, filed Oct. 8, 2018, titled "Display Assistant Device";

U.S. Provisional Patent Application No. 62/742,888, filed Oct. 8, 2018, titled "Drop Protection for Display Assistant Device";

U.S. Provisional Patent Application No. 62/743,464, filed Oct. 9, 2018, titled "Speaker Assembly in a Display Assistant Device."

This application is related to the following applications, each of which is incorporated by reference in its entirety:

International Application No. PCT/US2018/064449, filed Dec. 7, 2018, titled "Display Assistant Device";

International Application No. PCT/US2018/064536, filed Dec. 7, 2018, titled "Speaker Assembly in a Display Assistant Device";

U.S. patent application Ser. No. 16/525,360, filed Jul. 29, 2019, titled "Display Assistant Device," which claims priority to and is a continuation application of International Application No. PCT/US19/28601, filed Apr. 23, 2019, titled "Display Assistant Device"; and International Application No. PCT/US19/28959, filed Apr. 24, 2019, titled "Multipurpose Speaker Enclosure in a Display Assistant Device," which is herein incorporated by reference in its entirety.

TECHNICAL FIELD

This application relates generally to electronic devices, including but not limited to methods and systems of protecting a voice-activated display assistant device from being damaged by an impact of blunt force hitting on its edge.

BACKGROUND

Electronic devices integrated with microphones have been widely used to collect voice inputs from users and implement different voice-activated functions according to the voice inputs. These electronic devices, when made at a low cost and with relatively simple structures, are disposed at different locations in a smart home environment, so that they can be used as user interface devices to listen to the ambient and follow a user constantly without disturbing regular activities of the user. The electronic devices disposed at different locations could face different situations of blunt forces and fall to the ground, potentially causing fatal damages to themselves. It would be beneficial to incorporate one or more drop protection mechanisms to protect these electronic devices when they are used as daily user interface devices that could be placed anywhere in a home environment.

SUMMARY

An electronic device is applied in a smart home environment to provide an eyes-free and hands-free voice interface that can activate voice-activated functions for media devices or smart home devices in the smart home environment. The electronic device is configured to sit at a fixed location in the smart home environment, and at least includes a display screen in addition to a microphone and a speaker. The electronic device does not include a complicated operating system, but provides a low cost user interface solution dedicated to constantly listening to its surroundings, collecting audio inputs, and presenting both audio and video information in response to the audio inputs. Further, in some implementations, the audio inputs are collected from the surroundings to initiate voice-activated functions on other media play devices or smart home devices coupled within the smart home environment.

In one aspect, a display assistant device includes a display panel assembly and a back cover. The display panel assembly has a plurality of first edges and a plurality of first retention elements, and each first retention element is formed on a rear surface of the display panel assembly and adjacent to a corresponding first edge of the display panel assembly. The back cover has a plurality of second edges and a plurality of second retention elements, and is configured to hold the display panel assembly around the plurality of first edges of the display screen. The plurality of second edges of the back cover rise above the plurality of first edges of the display panel assembly. Each second retention element is arranged adjacent to a corresponding second edge of the back cover, and is complementary to and configured to be mated to one of the plurality of first retention elements of the display panel assembly. When mated to each other, the plurality of first and second retention elements are configured to control an in-plane displacement of each second edge of the back cover in response to an impact of a force on the plurality of second edges of the back cover, thereby limiting an out-of-plane displacement of each second edge of the back cover and protecting the first edges of the display panel assembly from falling apart from the second edges of the back cover.

In accordance with various embodiments of this application, the display assistant device has a substantially small footprint that allows the display assistant device to be conveniently disposed at many different locations (e.g., a kitchen, living room and bedroom) in the smart home environment. Despite the substantially small footprint, the speaker has a relatively heavy weight and is configured to pull a center of mass of the display assistant device close to the surface on which the display assistant device sits. A low center of mass allows the display assistant device to maintain stability at time of being touched or hit. In addition, the display assistant device further includes many mechanical features configured to protect the screen of the display assistant from falling apart from the base and being damaged when the display assistant device hits a floor. By these means, this application provides a low-cost, mechanically robust, and voice-activated user interface solution that has visual display capabilities and supports various voice-activated functions.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
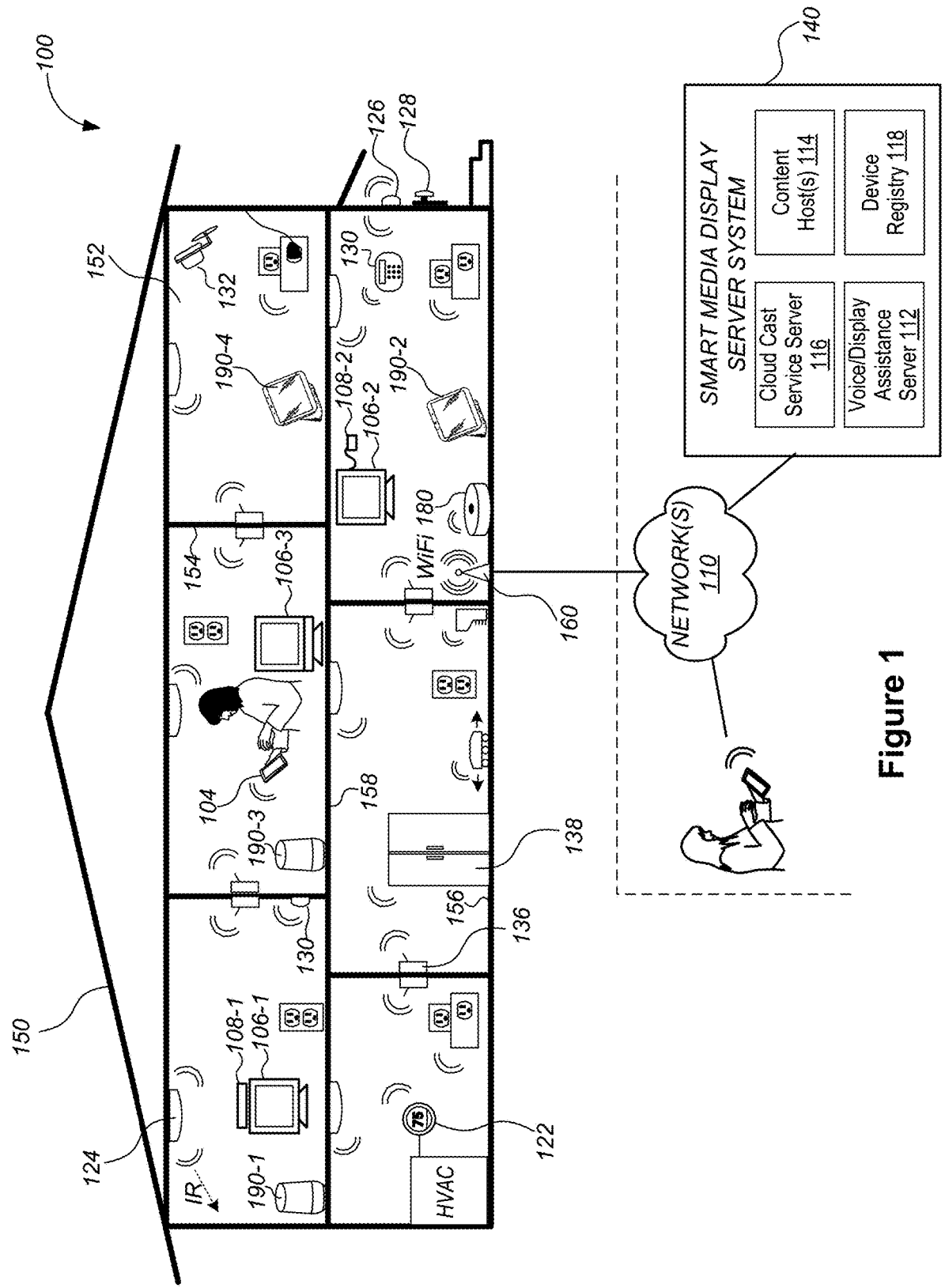
FIG. 1 is an example smart home environment in accordance with some implementations.

While digital revolution has provided many benefits ranging from openly sharing information to a sense of global community, emerging new technology often induces confusion, skepticism and fear among consumers, preventing consumers from benefiting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at an electronic device can carry instructions and information even if a user's line of sight is obscured and his hands are full. To enable hands-free and eyes-free experience, the voice-activated electronic device listens to the ambient (i.e., processes audio signals collected from the ambient) constantly or only when triggered. On the other hand, user identities are linked with a user's voice and a language used by the user. To protect the user identities, voice-activated electronic devices are normally used in non-public places that are protected, controlled and intimate spaces (e.g., home and car).

In accordance with some implementations of the invention, a voice-activated electronic device includes a screen configured to provide additional visual information in addition to audio information that can be broadcast via a speaker of the voice-activated electronic device. The voice-activated electronic device, when integrated with its own display screen, constitutes a display assistant device. The display assistant device thereby includes a base and a speaker in addition to the screen. The base is configured for sitting on a surface. The screen has a rear surface and is supported by the base at the rear surface. A bottom edge of the screen is configured to be held above the surface by a predefined height, and the base is substantially hidden behind the screen from a front view of the display assistant device (i.e., the base appears to float in air from the front view). The speaker is concealed inside the base and configured to project sound substantially towards the front view of the display assistant device. The display assistant device has a substantially small footprint, and however, a center of mass of the display assistant device is configured to be close to a surface on which the display assistant device sits, thereby allowing the display assistant device to maintain stability at time of being touched or hit. The display assistant device further includes a plurality of mechanical features configured to protect the screen from falling apart from the base and being damaged when the display assistant device hits a floor. That said, the display assistant device provides a low-cost, mechanically robust, and voice-activated user interface solution that has visual display capabilities and supports various voice-activated functions.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment 100 to provide media content that is stored at a local content source or streamed from a remote content source (e.g., content host(s) 114). The media devices can be classified to two categories: media output devices 106 that directly output the media content to audience, and cast devices 108 that are networked to stream media content to the media output devices 106. Examples of the media output devices 106 include, but are not limited to television (TV) display devices and music players. Examples of the cast devices 108 include, but are not limited to, set-top boxes (STBs), DVD players and TV boxes. In the example smart home environment 100, the media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-2 includes a smart TV device that integrates an embedded casting unit to stream media content for display to its audience. The media output device 106-3 includes a regular TV display that is coupled to a TV box (e.g., Google TV or Apple TV products), and such a TV box streams media content received from a media content host server 114 and provides an access to the Internet for displaying Internet-based content on the media output device 106-3.

In addition to the media devices 106 and 108, one or more electronic devices 190 are disposed in the smart home environment 100 to collect audio inputs for initiating various media play functions of the media devices. In some implementations, these voice-activated electronic devices 190 (e.g., devices 1901-1, 190-2 and 190-3) are disposed in proximity to a media device, for example, in the same room with the cast devices 108 and the media output devices 106. Alternatively, in some implementations, a voice-activated electronic device 190-4 is disposed in a room having one or more smart home devices but not any media device. Alternatively, in some implementations, a voice-activated electronic device 190 is disposed in a location having no networked electronic device.

The electronic device 190 includes at least one or more microphones, a speaker, a processor and memory storing at least one program for execution by the processor. The speaker is configured to allow the electronic device 190 to deliver voice messages to a location where the electronic device 190 is located in the smart home environment 100, thereby broadcasting music, reporting a state of audio input processing, having a conversation with or giving instructions to a user of the electronic device 190. As an alternative to the voice messages, visual signals could also be used to provide feedback to the user of the electronic device 190 concerning the state of audio input processing. When the electronic device 190 is a conventional mobile device (e.g., a mobile phone or a tablet computer) or has its own display screen, its display screen is configured to display a notification concerning the state of audio input processing.

In accordance with some implementations, the electronic device 190 is a voice interface device that is network-connected to provide voice recognition functions with the aid of a cloud cast service server 116 and/or a voice/display assistance server 112. For example, the electronic device 190 includes a smart speaker that provides music to a user and allows eyes-free and hands-free access to voice assistant service (e.g., Google Assistant). Optionally, the electronic device 190 is one of a desktop or laptop computer, a tablet and a mobile phone that includes a microphone. Optionally, the electronic device 190 is a simple and low cost voice interface device, e.g., a speaker device and a display assistant device (including a display screen having no touch detection capability).

In some implementations, the voice-activated electronic devices 190 includes a display assistant device (e.g., 190-2 and 190-4) that incorporates a display screen in addition to the microphones, speaker, processor and memory. The display screen is configured to provide visual information in addition to audio information that can be broadcast via the speaker of the voice-activated electronic device 190. When a user is nearby and his or her line of sight is not obscured, the user may review the visual information directly on the display screen of the display assistant device. Optionally, the visual information provides feedback to the user of the electronic device 190 concerning the state of audio input processing. Optionally, the visual information is provided in response to the user's previous voice inputs, and may be related to the audio information broadcast by the speaker. In some implementations, the display screen of the voice-activated electronic devices 190 includes a touch display screen configured to detect touch inputs on its surface. Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the media output devices 106 via the cast devices 108, the electronic device 190 effectively enables a new level of control of cast-enabled media devices independently of whether the electronic device 190 has its own display. In a specific example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms.

Specifically, in some implementations, the electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself or on another connected media output device 106. For example, the user could issue a media play request by saying to the WiFi speaker "OK Google, Play cat videos on my Living room TV." The personal assistant service then fulfils the media play request by playing the requested media content on the requested device using a default or designated media application.

A user could also make a voice request via the microphone of the electronic device 190 concerning the media content that has already been played on a display device. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability. In some implementations, a user may want to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device 106 coupled to the first cast device 108 from the exact point within a music track or a video clip where play of the media content was forgone on the first output device 106.

In some implementations, in addition to the media devices (e.g., the output devices 106 and the cast devices 108) and the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices). The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

The smart home devices in the smart home environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart home environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart home environment 100 may additionally or alternatively include one or more other occupancy sensors (e.g., touch screens, IR sensors, ambient light sensors and motion detectors). In some implementations, the smart home devices in the smart home environment 100 include radio-frequency identification (RFID) readers (e.g., in each room 152 or a portion thereof) that determine occupancy based on RFID tags located on or embedded in occupants. For example, RFID readers may be integrated into the smart hazard detectors 124.

In some implementations, in addition to containing sensing capabilities, devices 122, 124, 126, 128, 130, 132, 136 and 138 (which are collectively referred to as "the smart home devices" or "the smart home devices 120") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 140, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices 120 serve as wireless or wired repeaters. In some implementations, a first one of and the cast devices 108 communicates with a second one of the cast devices 108 and the smart home devices 120 via a wireless router. The cast devices 108, the electronic devices 190 and the smart home devices 120 may further communicate with each other via a connection (e.g., network interface 160) to a network, such as the Internet 110. Through the Internet 110, the cast devices 108, the electronic devices 190 and the smart home devices 120 may communicate with a smart server system 140 (also called a central server system and/or a cloud-computing system herein). Optionally, the smart server system 140 may be associated with a manufacturer, support entity, or service provider associated with the cast devices 108 and the media content displayed to the user.

Accordingly, the smart server system 140 may include a voice/display assistance server 112 that processes audio inputs collected by voice-activated electronic devices 190, one or more content hosts 114 that provide the displayed media content, a cloud cast service server 116 creating a virtual user domain based on distributed device terminals, and a device registry 118 that keeps a record of the distributed device terminals in the virtual user environment. Examples of the distributed device terminals include, but are not limited to the voice-activated electronic devices 190, cast devices 108, media output devices 106 and smart home devices 122-138. In some implementations, these distributed device terminals are linked to a user account (e.g., a Google user account) in the virtual user domain.

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

When the voice-activated electronic devices 190 are used as user interface devices applied in a user's daily life, they are placed at different locations in the smart home environment 100, and merge into the smart home environment 100. The locations where the voice-activated electronic devices 190 are placed could be drastically different, so the electronic devices 190 are configured to have small footprints that can fit into different locations. An electronic device 190, when placed at different locations, faces different situations of blunt forces that may hit the electronic device 190 and push it off to the ground. Therefore, the center of mass, an orientation of the screen, an orientation and the base of the voice-activated electronic devices 190 are configured so that the voice-activated electronic devices 190 (particularly, a display assistant device) can sustain a blunt force up to a threshold level without being tipped over. Retention elements are also integrated to prevent edges of a display panel from falling apart from edges of a back cover in the voice-activated electronic device 190.

Figure 2A:
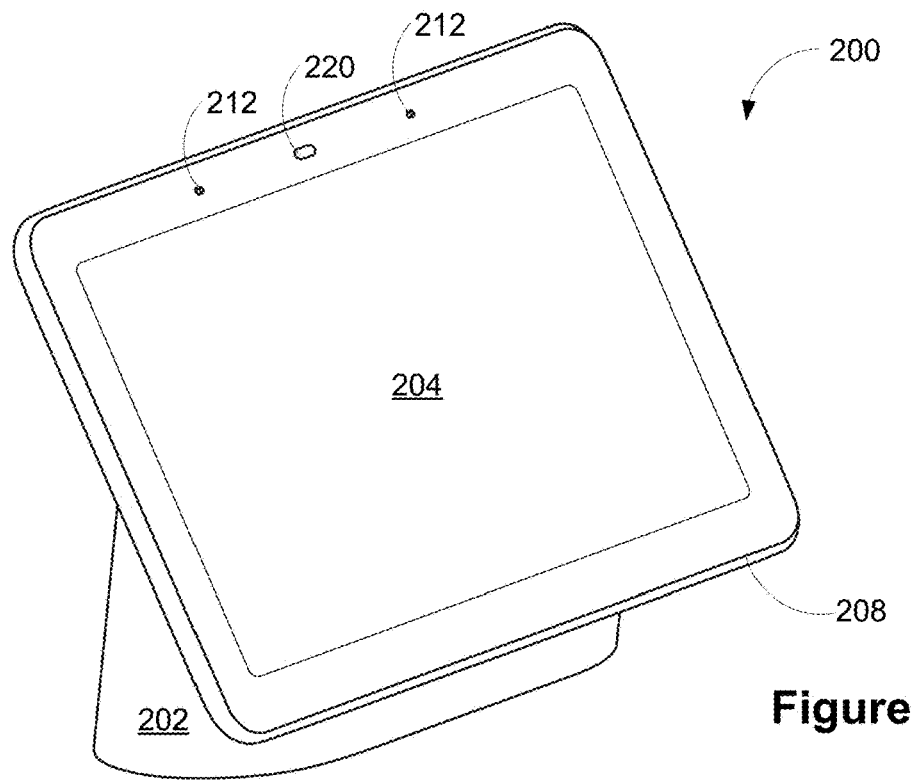
FIGS. 2A and 2B are a perspective view and a side view of a display assistant device (an example of the voice-activated electronic device having a display screen) in accordance with some implementations, respectively.
Figure 2B:
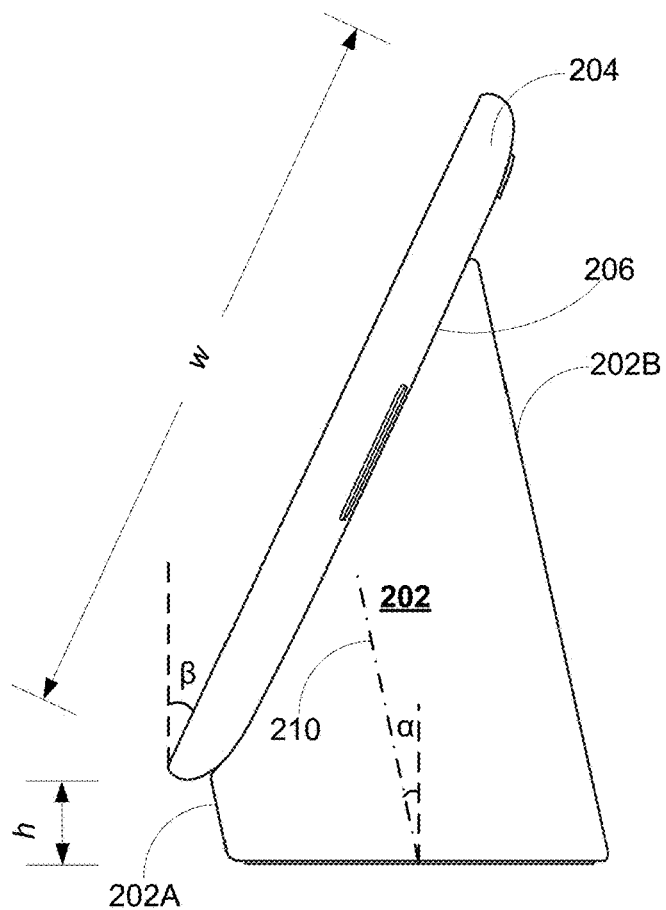

FIGS. 2A and 2B are a perspective view and a side view of a display assistant device 200 (an example of the voice-activated electronic device 190 having a display screen) in accordance with some implementations, respectively. The display assistant device 200 includes a base 202 and a screen 204. The base 202 is configured for sitting on a surface. The screen 204 has a rear surface 206 at which the screen 204 is supported by the base 202. A bottom edge 208 of the screen 204 is configured to be held above the surface by a predefined height h. The base 202 is substantially hidden behind the screen 204 from the front view of the display assistant device 200. That said, the predefined height h is less than a predetermined threshold (e.g., 15 mm), such that the screen 204 appears to float in air and the base 202 can be substantially hidden behind the screen 204 from the front view of the display assistant device 200. In an example, the predetermined threshold is 10% of a width w of the screen 204. If the screen 204 is a seven-inch screen having a width of 5 inch, the bottom edge 208 of the screen 204 is held above the surface by a height of 12.7 mm or below.

Referring to FIG. 2B, in some implementations, the base 202 extends along a central axis 210, and the central axis 210 of the base 202 is not perpendicular to the surface when the base 202 sits on the surface. Optionally, the base 202 has a front surface 202A and a rear surface 202B both of which are parallel with the central axis 210. The central axis 210, front surface 202A and rear surface 202B of the base 202 lean forward by a base angle α when the base sits on the surface. It is noted that the front surface 202A of the base is shorter than the rear surface 202B of the base, e.g., a height of the front surface 202A is only 20% of that of the rear surface 202B. When the screen 204 is supported by the base 202 at its rear surface 206, the screen 204 is not perpendicular to the surface, but faces substantially forward and leans slightly backward by a screen angle β for the purposes of providing a desirable viewing angle for an average user. In an example, both the base angle α and the screen angle β are equal to 15 degrees, except that the base leans forward by the base angle α of 15 degrees and the screen leans backward by the screen angle β of 15 degrees. By these means, the display assistant device 200 does not tip over (forward or backward) easily when a blunt force F hits a top edge of the display assistant device 200 or a user touch occurs to the screen 204 of the display assistant device 200.

The base 202 acts a speaker box. A speaker is concealed inside the base and configured to project sound substantially towards the front view of the display assistant device, i.e., through a space of the predefined height h separating the bottom edge 208 of the screen 204 and the surface on which the display assistant device 200 is configured to sit.

The display assistant device 200 has a substantially narrow bezel area surrounding an active display area of the screen 204. In some implementations, the bezel area includes one or more microphone holes 212. One or more microphones are placed behind the microphone holes 212 and configured to collect sound from the ambient of the display assistant device 200. In some implements, the display assistant device 200 further includes a sensor opening 220 configured to access an ambient light sensor and/or a RGB color sensor. The ambient light sensor or RGB color sensor is configured to detect a light condition in the smart home environment 100 where the display assistant device 200 sits. In some implementations, the display assistant device 200 is configure to adjust a brightness level of its screen 204 according to the light condition. The ambient light sensor and the RGB color sensor are disposed behind the bezel area and exposed to light via transparent part of the bezel area, e.g., the sensor opening 220.

A bottom surface of the base 202 constitutes a footprint of the display assistant device 200. A length of the bottom surface of the base 202 is smaller than (e.g., 75% or less of) a length of the screen 204, and a width of the bottom surface of the base 202 is significant smaller than (e.g., <40% or less of) a width w of the screen 204. As a result, the footprint of the display assistant device 200 is substantially small, and the display assistant device 200 can therefore fit into different physical settings (e.g., a kitchen, living room and bedroom) in the smart home environment 100.

Figure 3:
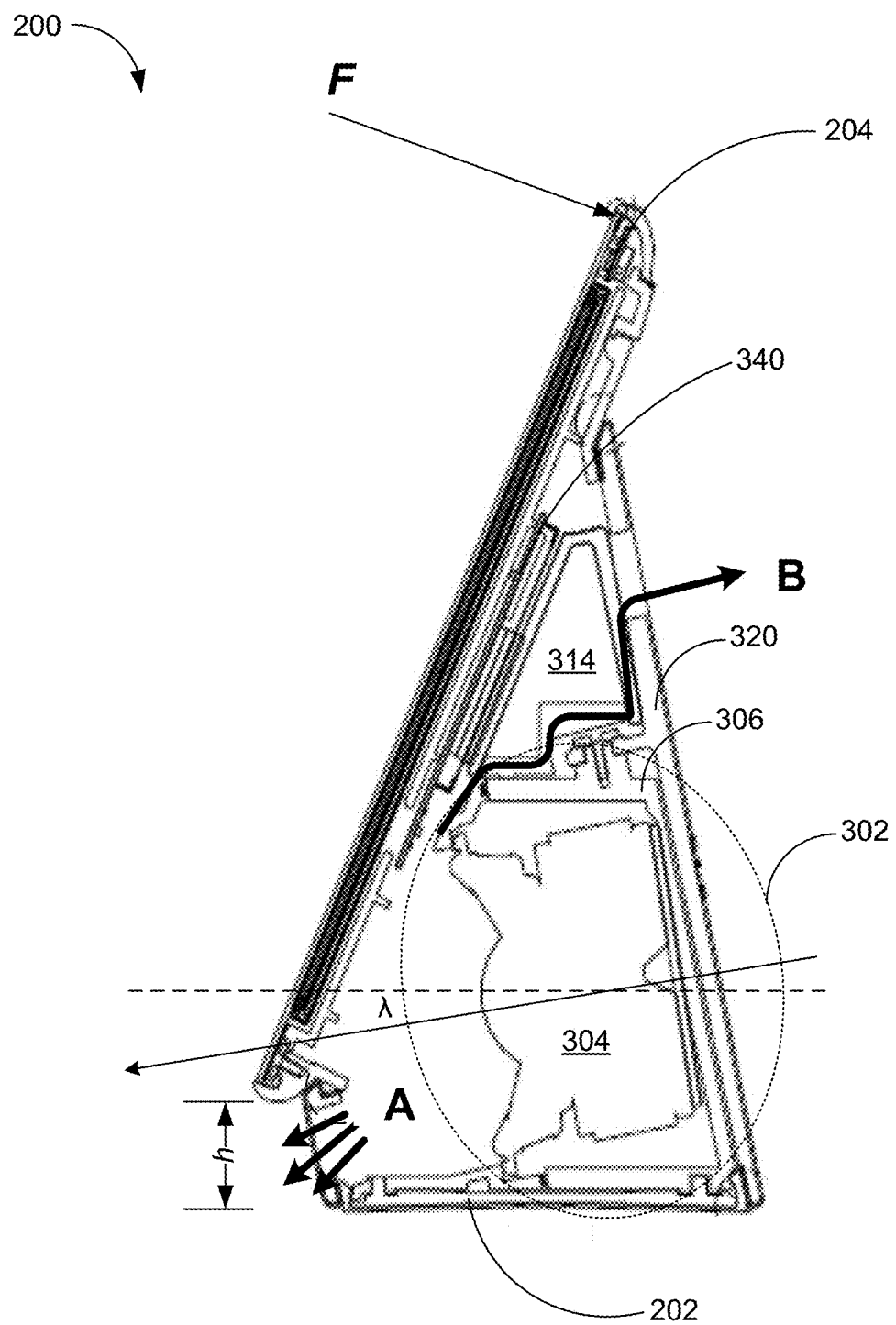
FIG. 3 is a cross sectional view of a display assistant device in accordance with some implementations.

FIG. 3 is a cross sectional view of a display assistant device 200 in accordance with some implementations. The display assistant device 200 includes a speaker assembly 302, and the speaker assembly 302 further includes a speaker 304 held in a speaker waveguide 306. The speaker 304 is concealed inside the base 202 and has a speaker opening. The speaker opening has a dimension substantially greater than a predefined height h of the space separating a bottom edge of the screen 204 and a surface on which the display assistant device 200 is configured to sit. The speaker opening faces forward and is tilted downward with a tilting angle A.

The speaker 304 is configured to project sound substantially towards a front view of the display assistant device 200, i.e., project a substantial portion (e.g., 80% or more) of sound generated by the speaker 304 towards the space between the bottom edge of the screen 204 and the surface. A housing 320 of the base 202 includes a plurality of speaker grill portions disposed on one or more of a front surface 202A, a rear surface 202B, a left side and a right side of the base 202. In some implementations, a substantial portion of the sound generated by the speaker 304 (e.g., sound component A in FIG. 3) exits the base 202 via speaker grill portions on the front surface 202A of the base 202. Remaining portions of the sound generated by the speaker 304 (e.g., sound component B in FIG. 3) are guided inside the housing 320 to exit the base 202 via a subset of speaker grill portions that are disposed on one or more of the rear surface 202B, left side and right side of the base 202.

The speaker assembly 302 is disposed in a lower portion of a base 202 to lower down a center of mass of the entire display assistant device 200. In some implementations, for the purposes of lowering down the center of mass, a speaker assembly having a larger weight is selected over a speaker assembly having a smaller weight when their costs or speaker box volumes are comparable. For example, a speaker has a volume of 120 cc, and a Neodymium based speaker is selected over a Ferrite based speaker because of its weight advantage. Given its center of mass, weight and angles (α and β), the display assistant device 200 does not tip over (forward or backward) easily when a blunt force F hits a top edge of the display assistant device 200 or a user touch occurs to the screen 204 of the display assistant device 200. For example, the center of weight is configured so that the display assistant device 200 can sustain an impact force of 50 Newton without tipping over.

As explained above, the front surface 202A of the housing 320 is lower than the rear surface 202B of the housing 320, such that the housing 320 has a tilted opening configured to receive the screen 204. That said, the screen 204 and the base 202 are interconnected to form an interior space. In this interior space, a main logic board 340 is arranged in parallel with a display panel of the screen, and a heat sink 314 comes into contact with the main logic board 340 to absorb heat generated by the main logic board 340. The heat sink 314 is thereby disposed in the upper portion of the base 202. Optionally, the heat sink 314 at least partially sits on the speaker waveguide 306. Optionally, the heat sink 314 is mechanically attached to the main board 340 that is further included in the screen 204. The heat sink 314 is suspended above the speaker waveguide 306 and separated therefrom by a gap, and sound generated by the speaker 304 is partially guided towards the rear surface of the base 202 via the gap in accordance with a sound propagation path B.

Figure 4A:
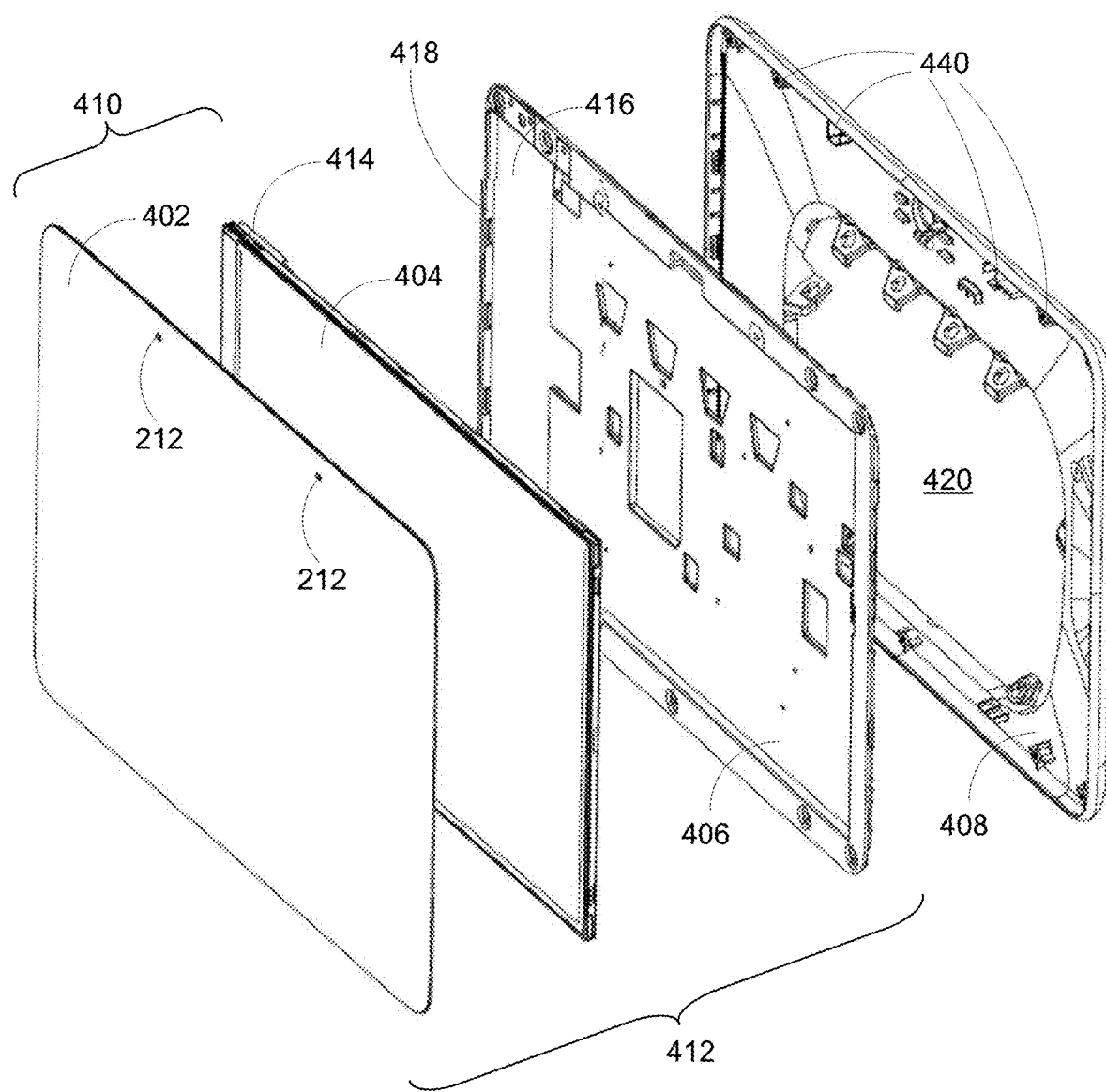
FIG. 4A is an exploded view of a screen including a cover glass, a display panel 404, a middle frame and a back cover of a display assistant device in accordance with some implementations.
Figure 4B:
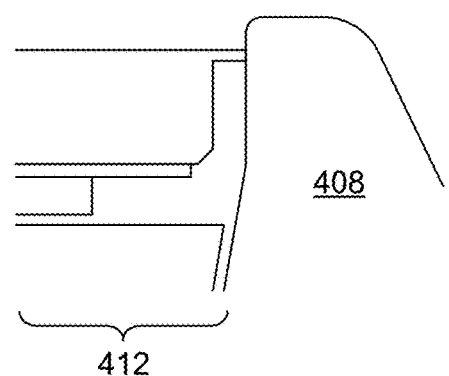
FIG. 4B is an edge of a screen of a display assistant device in accordance with some implementations.

FIG. 4A is an exploded view of a screen 204 including a cover glass 402, a display panel 404, a middle frame 406 and a back cover 408 of a display assistant device 200 in accordance with some implementations, and FIG. 4B is an edge of a screen 204 of a display assistant device 200 in accordance with some implementations. In some implementations, the cover glass 402, the display panel 404 are integrated in a display front 410, which is optionally obtained as an off-the-shelf module. In some implementations, the cover glass 402, the display panel 404 and the middle frame 406 are integrated in a display panel assembly 412 that is further assembled with the back cover 408 to form the screen 204. Referring to FIG. 4B, in some implementations, when the display panel assembly 412 is assembled with the back cover 408, an edge of the back cover 408 rises above a corresponding edge of the display panel assembly 412 so that when the screen 204 hits the ground, the edge of the back cover 408 can protect the edge of the display panel assembly 412 (specifically, an edge of the cover glass 402) from hitting the ground and being shattering. Further, in some situations, the edge of the back cover 408 not only rises above, but also slightly wraps around the edge of the display panel assembly 412. In some implementations, the edge of the back cover 408 rises above a corresponding edge of the display panel assembly 412 by a substantially small height (e.g., <0.5 mm) that is unnoticeable to a user.

The display panel 404 is configured to display graphics content. Optionally, the display panel 404 is substantially flat. Optionally, the display pane 404 is curved, and covered by a curved cover glass layer 402. In some implementations, a display panel assembly 412 does not have a cover glass 402 covering the curved display panel 404; rather, the display panel 404 includes a protective layer on its top surface.

Edge areas of a rear surface of the cover glass 402 are covered with paint to define a bezel area surrounding an active display area of the screen 204. In some implementations, the bezel area includes one or more microphone holes 212. One or more microphones are placed behind the microphone holes 212 and configured to collect sound from the ambient of the display assistant device 200. Optionally, the cover glass 402 is coupled to the display panel 404 using an adhesive. The display panel 404 has a rear surface made of thermally and/or electrically conductive material (e.g., a metal plate). When a thermal spreader is attached to a portion of the rear surface of the display panel 404, the thermal spreader redistributes heat evenly across itself and the portion of the rear surface of the display panel 404, thereby avoiding formation of hot spots on the display panel 404.

The middle frame 406 is disposed between the display front 410 (i.e., a combination of the cover glass 402 and the display panel 404) and the back cover 408. The middle frame 406 is mechanically coupled to the display front 410 using an adhesive that is applied adjacent to edges of the display front 410 and middle frame 406. Further, the middle frame 406 is mechanically coupled to the back cover 408 using an adhesive or mechanical structures. Specifically, the middle frame 406 has a plurality of first retention elements, and each first retention element is formed on a rear surface of the middle frame 406 and adjacent to an edge of the middle frame 406. The back cover 408 has a plurality of second retention elements 440 that are complementary to and configured to be mated to the plurality of first retention elements. When the middle frame 406 (which has been integrated with the display front 410) and the back cover 408 are aligned and assembled to each other, the plurality of first and second retention elements are mated to each other and configured to control an in-plane displacement of edges of the back cover 408 in response to an impact of a force on the edges of the back cover 408, thereby limiting an out-of-plane displacement of each edge of the back cover 408 and protecting edges of the display front 410 from falling apart from the edges of the back cover 408. More details on drop protection features of the display assistant device 200 (e.g., the first and second retention elements) are discussion with reference to FIGS. 5-8.

The display panel 404 of the display front 410 is coupled to a display module 414 that is configured to provide backlight sources and drive individual display pixels of the display panel 404. Optionally, the display module 414 is disposed adjacent to an edge of the display panel 404. The display module 414 protrudes from the rear surface of the display panel 404. The middle frame 406 includes a void area 416 configured to receive the display module 414. When the middle frame 406 is integrated with the display front 410, the protruded display module 414 sits and is enclosed in the void area 416 of the middle frame 406.

In some implementations, the middle frame 406 is substantially made of polymeric material (e.g., glass-reinforced polycarbonate). For example, a predetermined amount (e.g., 30%) of glass fibers is added to polycarbonate to increase tensile strength, stiffness and compressive strength, and reduce the thermal expansion coefficient of the middle frame 406. Further, in some implementations, the middle frame 406 includes a metal insert 418, i.e., a portion of the middle frame 406 is made of metal. The metal insert 418 is configured to create the void area 416. Optionally, the metal insert 418 includes a substantially thin edge of the middle frame 406 attached to a polymeric body of the middle frame 406. Optionally, the metal insert 418 covers a side of the substantially thin edge or wraps around the substantially thin edge, when the substantially thin edge of the middle frame 406 extends from the polymeric body of the middle frame 406. The metal insert 418 is configured to provide mechanical rigidity to the middle frame 406 and sustain a mechanical impact (e.g., a force causing twisting and warping of the substantially thin edge) that could occur when the middle frame 406 is assembled with the display front 410.

In some implementations not shown in FIG. 4, the display assistant device 200 further includes a main logic board 340 mounted on a rear surface of the middle frame 406. The main logic board 340 includes a plurality of electronic components that generate heat. A heat sink 314 is attached to the main logic board 340 to absorb the heat generated thereon. Optionally, the heat sink 314 is solid. Optionally, the heat sink 314 is hollow and contains an insert. The main logic board 340 and the heat sink 314 are attached to the rear surface of the middle frame 406, which is further assembled with the display front 410 and the back cover 408. The back cover 408 includes a first opening 420 at a central portion of the screen 204. When the back cover 408 is assembled onto the screen 204, the main logic board 340 and the heat sink 314 attached to the middle frame 406 are aligned with the first opening 420 of the back cover 408 and protrude out of the first opening 420.

During an example assembly process, the display front 410, the middle frame 406 and the base 202 are provided separately. A speaker assembly 302 is disposed in the housing 320, which is further covered by a base mount plate to form the base 202. The back cover 408 is assembled to the base 202, optionally by fastening top and bottom edges of the first opening 420 of the back cover 408 to an interior rear surface and a front surface of the housing 320, respectively. After the back cover 408 is assembled to the base 202, the middle frame 406 is coupled to the back cover 408 via a plurality of first retention elements on the rear surface of the middle frame 406 and a plurality of second retention elements on a front surface of the back cover 408. The display front 410 is coupled to the middle frame 406 via an adhesive either before or after the middle frame 406 is coupled to the back cover 408 and the base 202.

Figure 5A:
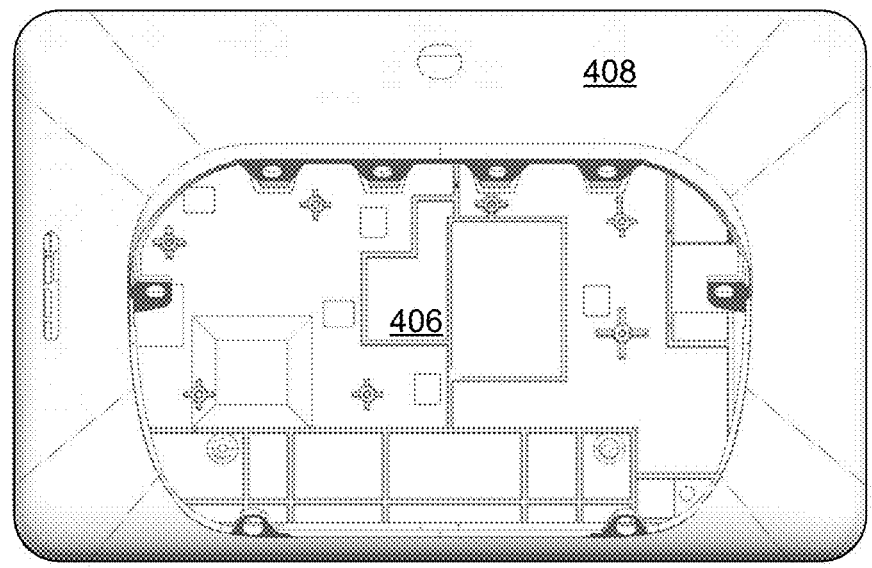
FIGS. 5A and 5B are two opposite sides of a middle frame that is assembled onto a back cover of a display assistant device in accordance with some implementations.
Figure 5B:
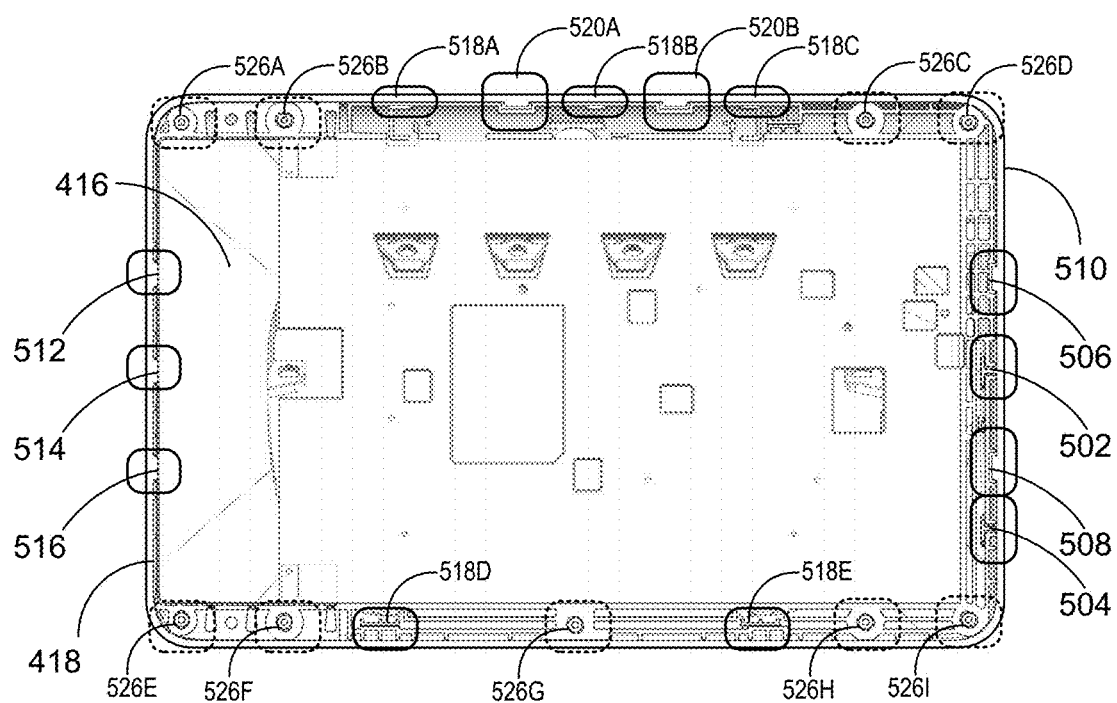

FIGS. 5A and 5B are two opposite sides of a middle frame 406 that is assembled onto a back cover 408 of a display assistant device 200 in accordance with some implementations. It is noted that if the back cover 408 is not mounted on a base 202, part of the middle frame 406 is exposed from a first opening 420 of the back cover 408. In some implementations, a main logic board 340 is mounted on the exposed part of the middle frame 406. A heat sink 314 could be attached to the main logic board 340. Optionally, the main logic board 340, the heat sink 314 or both of them are aligned with the first opening 420 and protrude out of the first opening 420 of the back cover 408.

The middle frame 406 has a plurality of first edges and a plurality of first retention elements, and each first retention element is formed adjacent to or on a corresponding first edge of the middle frame 406. The back cover 408 has a plurality of second edges and a plurality of second retention elements and configured to hold the middle frame 406 around the plurality of first edges of the middle frame 406. It is noted that under most circumstances, the back cover 408 is fastened to the base 202 and the middle frame 406 is part of the display panel assembly 412. The plurality of first and second retention elements are configured to couple the display panel assembly 412 and the back cover 408 to each other and protect edges of the display panel assembly 412 (particularly, edges of the cover glass 402) from falling apart from the second edges of the back cover 408. Sometimes, the plurality of first edges and the plurality of first retention elements of the middle frame 406 are part of a plurality of first edges and a plurality of first retention elements of the display panel assembly 412, respectively.

The plurality of second edges of the back cover 408 rise above the plurality of first edges of the display panel assembly 412 (more specifically, above edges of a cover glass 402 and a display panel 404) for the purposes of protecting the display panel assembly 412. Each second retention element of the back cover 408 is arranged adjacent to a corresponding second edge of the back cover 408, and is complementary to and configured to be mated to one of the plurality of first retention elements of the display panel assembly 412. That said, the plurality of second retention elements are aligned with the plurality of first retention elements. When mated to each other, the plurality of first and second retention elements are configured to control an in-plane displacement of each second edge of the back cover 408 in response to an impact of a force on the plurality of second edges of the back cover 408, thereby limiting an out-of-plane displacement of each second edge of the back cover 408 and protecting the first edges of the display panel assembly 412 from falling apart from the second edges of the back cover 408.

In some implementations, the plurality of first edges of the display panel assembly 412 include all four peripheral edges of the display panel assembly 412, and the plurality of first retention elements include one or more first retention elements placed on a rear surface of the display panel assembly and adjacent to each of the plurality of first edge of the display panel assembly 412. Optionally, the one or more first retention elements are distributed evenly or unevenly along the one of the first edges of the display panel assembly 412. Further, in some implementations, the one or more first retention elements placed adjacent to one of the plurality of first edges include at least one first retention element 502 or 504 that is placed adjacent to a middle point of the one of the plurality of first edges.

In some implementations, one of the plurality of first retention elements and a corresponding second retention element are configured to at least partially constrain the out-of-plane displacement of a corresponding second edge of the back cover 408 directly. In some implementations, in addition to the first and second retention elements, the display assistant device 200 further includes a plurality of fastener structures (e.g., structures 526) configured to constrain the out-of-plane displacement of the plurality of second edges of the back cover 408 directly.

Figure 6A:
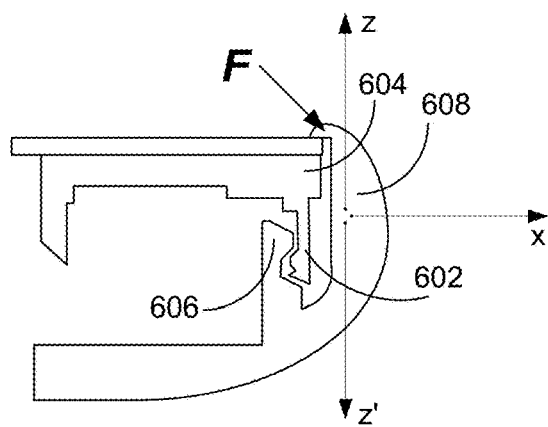
FIGS. 6A and 6B are an example edge area of a display assistant device before and after the edge is impacted by a blunt force F in accordance with some implementations, respective.
Figure 6B:
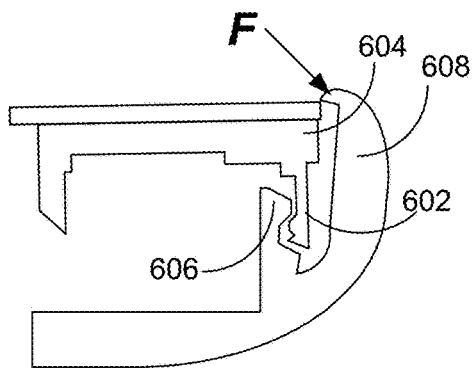
Figure 6C:
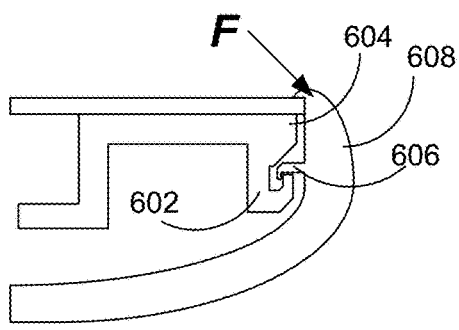
FIGS. 6C and 6D are another example edge area of a display assistant device before and after the edge is impacted by a blunt force F in accordance with some implementations, respective.
Figure 6D:
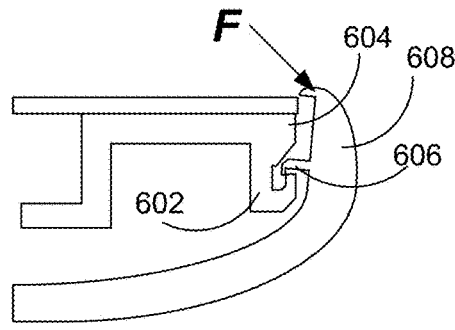

FIGS. 6A and 6B are an example edge area 600 of a display assistant device 200 before and after the edge 600 is impacted by a blunt force F in accordance with some implementations, respectively. FIGS. 6C and 6D are another example edge area 640 of a display assistant device 200 before and after the edge 600 is impacted by a blunt force F in accordance with some implementations, respectively. FIGS. 6A-6D are cross sectional view of the corresponding edge of the display assistant device 200. For both of the edge areas 600 and 640, a first fastener structure 602 is formed adjacent to a first edge 604 of a display panel assembly 412 and on a rear surface of the display panel assembly 412. A second fastener structure 606 is formed adjacent to a second edge 608 of a back cover 408 and on an interior surface of the back cover 408. The second fastener structure 606 is configured to be mated to the first fastener structure 602 for holding the display panel assembly 412 onto the back cover 408. In particular, the first and second fastener structures 602 and 606 are configured to primarily suppress an out-of-plane displacement (e.g., along a z-axis), between the display panel assembly 412 and the back cover 408, which could separate them apart from each other.

The second edge 608 of the back cover 408 rises above and optionally wraps around the first edge 604 of the display panel assembly 412. Referring to FIG. 6A, the force F pushes away the second edge 608 of the back cover 408, and the first edge 604 of the back cover 408 cannot be held by the second edge 608 anymore, thereby causing the display panel assembly 412 to fall apart from the back cover 408 and potentially hit a hard surface. Referring to FIG. 6B, the first and second fastener structures 602 and 606 have complementary hook structures providing additional retention force to hold the second edge 608 of the back cover 408. However, when the force F increases above a certain magnitude, it can still push away the second edge 608 of the back cover 408 and cause the display panel assembly 412 to fall apart from the back cover 408.

As a solution, one or more retention elements are applied on the first and second edges 604 and 608 to control an in-plane displacement (e.g., along an x-axis) of the second edge 608 of the back cover 408 in response to the impact of the force F. Once the in-plane displacement of the second edge 608 of the back cover 408 is controlled, a tip of the second fastener structure 606 of the second edge 608 is not stressed beyond their capabilities and can hold the first edge 604 at its position properly, i.e., does not let go the first edge 604 of the display panel assembly 412. Stated another way, the in-plane displacement control helps limit the out-of-plane displacement of the second edge 608 of the back cover 408, thereby protecting the first edge 604 of the display panel assembly 412 from falling apart from the second edge 608 of the back cover 408.

Figure 6E:
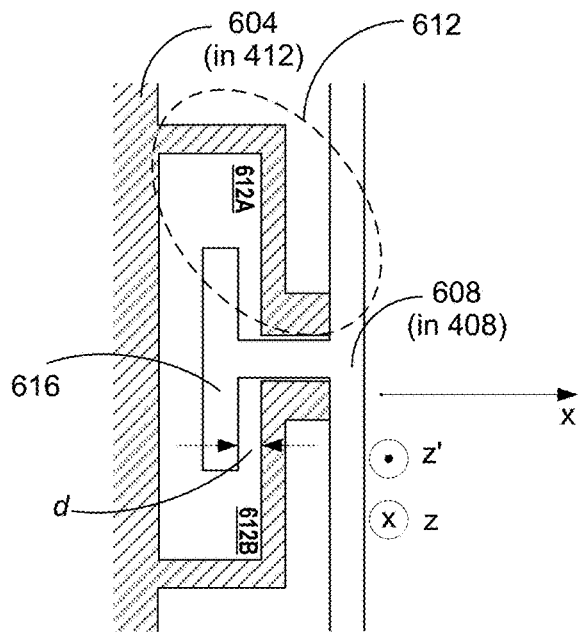
FIG. 6E is a top view of a first retention element of a display panel assembly and a second retention element of a back cover that are configured to mate with each other and sustain an impact of force F to a display assistant device in accordance with some implementations.

FIG. 6E is a top view of a first retention element 612 of a display panel assembly 412 and a second retention element 616 of a back cover 408 that are configured to mate with each other and sustain an impact of force F to a display assistant device 200 in accordance with some implementations. The first retention element 612 and the second retention element 616, when mated, are concealed in the screen 204 of the display assistant device 200, and not visible to a user of the device 200. FIG. 6E is a cross sectional view of the screen at a cross section that is parallel with a front surface of the display assistant device 200. The first and second retention elements 620 are configured to limit an in-plane displacement of the second edge 608 of the back cover 408 in response to the impact of the force F, thereby limiting an out-of-plane displacement of the second edge 608 and protecting the first edge 604 of the display panel assembly 412 from falling apart from the second edge 608 of the back cover 408.

In some implementations, when mated to each other, the first retention element 612 and the second retention element 616 are configured to control the in-plane displacement of the second edge 608 of the back cover 408 within a predefined safe displacement range, e.g., less than 1 mm. For clarification, the in-plane displacement of the second edge 608 of the back cover 408 is along a first in-plane direction (e.g., x-axis) that is substantially parallel to a surface of the display panel assembly 412. In contract, the out-of-plane displacement of the second edge of the back cover is along a second out-of-plane direction (e.g., z-axis, which is directed into FIG. 6E) that is perpendicular to the surface of the display panel assembly 412. The first retention element 612 and the second retention element 616 are configured to be mated to each other when the back cover 408 is moved towards and assembled to the display panel assembly 412 along a third out-of-plane direction (e.g., z'-axis, which is directed out of FIG. 6E) that is opposite to the second out-of-plane direction and perpendicular to the first in-plane direction.

Optionally, the first retention element 612 is not held to the corresponding second retention element 616 at the second out-of-plane direction using any mechanical feature of the respective first and second retention elements. Rather, a first fastener structure 602 is disposed on another location of the same edge of the display panel assembly 412, and held onto a corresponding fastener structure 606 on the back cover 408 along the second out-of-plane direction. That said, referring to FIG. 5B, the display assistant device 200 includes a short edge 510 in which the display panel assembly 412 and the back cover 408 are mechanically coupled to each other via two retention element pairs 502 and 504 and two fastener structure pairs 506 and 508. The retention element pairs 502 and 504 are configured to control the in-plane displacement of the back cover 408 along the first in-plane direction (e.g., x-axis), and the fastener structure pairs 506 and 508 are configured to control the out-of-plane displacement of the back cover 408 along the second out-of-plane direction (e.g., z-axis). The retention element pairs and the fastener structure pairs work together to protect the display panel assembly 412 from falling apart from the back cover 408. Also, in some implementations, the display assistant device 200 includes additional retention element pairs 518A-518E configured to control the in-plane displacement of the back cover 408 along the first in-plane direction (e.g., x-axis), and additional fastener structure pairs 520A-520B and 526A-526I that are configured to control the out-of-plane displacement of the back cover 408 along the second out-of-plane direction (e.g., z-axis).

When the retention elements 612 and 616 and the fastener structures 602 and 606 work to protect the display panel assembly 412 from falling apart from the back cover 408, the display panel assembly 412 is configured to sustain a force on the second edge 608 or 510 of the back cover. This force complies with a panel protection standard that requires protection of the first edge 604 of the display panel assembly 412 from falling apart from the second edge 608 of the back cover 408 when the display assistant device hits a ground after a free fall of a predetermined height (e.g., 0.9 m). In some implementations, a small but safe range of movement of the corresponding second edge 608 of the back cover 408 is allowed with respect to the first edge 604 of the display panel assembly 412 to absorb energy accumulated from the free fall. In some implementations, the panel protection standard defines an upper limit for the force sustained by the second edge 608 or 510 of the back cover 408. The upper limit of the force is determined based on a weight of the display assistant device 200 and an impact angle of the force associated with a worst situation, e.g., the force being applied directly along the second out-of-plane direction.

In some implementations, the second edge 608 of the back cover 408 is permitted to detach from the first edge 604 of the display panel assembly 412 by a predefined safe displacement range along the first in-plane direction. This predefined safe displacement range is provided by mechanical structures of the first and second retention elements 612 and 616. For example, the second retention element 616 has a T shape that includes a leg and two arms. The leg is anchored on or near the second edge 608 of the back cover 408 and extends away from the second edge 608. The first retention element 612 mated to the second retention element 616 has two extended portions 612A and 612B configured to hold behind two extended arms of the T shape, thereby controlling the in-plane displacement of the respective second edge 608 of the back cover 408. Specifically, when the back cover 408 moves along the first in-plane direction, it can move at least by a distance d permitted by a length of the leg of the T shape, and potentially by an additional distance when the extended portions 612A and 612B are stretched. The additional distance is determined by a flexibility of the extended portions 612A and 612B, which is a combination of mechanical properties, geometry and dimensions of the extended portions 612A and 612B. Therefore, the predefined safe displacement range of the second edge 608 of the back cover 408 is defined jointly by a length of the leg of the T shape and a mechanical structure of the extended portions 612A and 612B.

Figure 6F:
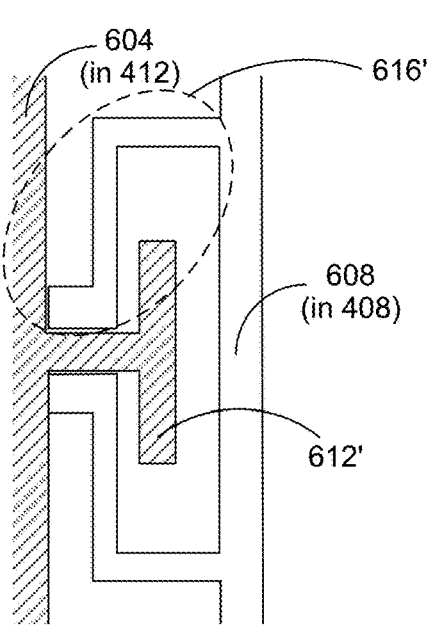
FIG. 6F is a top view of another first retention element of a display panel assembly and another second retention element of a back cover that are configured to mate with each other in accordance with some implementations.

In some implementations, the first retention element 612 and the second retention element 616 are exchangeable when they are disposed at the edges of the display panel assembly 412 and the back cover 408. For example, FIG. 6F is a top view of another first retention element 612' of a display panel assembly 412 and another second retention element 616' of a back cover 408 that are configured to mate with each other in accordance with some implementations. The retention elements depicted in FIG. 6F are identical to those depicted in FIG. 6E, except that the first retention element 612' of the display panel assembly 412 in FIG. 6F is identical to the second retention element 616 of the back cover 408 in FIG. 6E, and that the second retention element 616' of the back cover 408 in FIG. 6F is identical to the first retention element 612 of the display panel assembly 412 in FIG. 6E.

As explained above, the display panel assembly 412 includes a middle frame 406 attached to a rear surface of the display panel 404. In some implementations, the middle frame 406 provides the rear surface and one or more first edges of the display panel assembly 412 on which the first retention element 612 and the first fastener structure 602 are formed. Alternatively, in some implementations, at least one first edge 604 of the display panel assembly 412 is provided by the display module 404, and the middle frame is sandwiched between the display panel 404 and the back cover 408 and recessed from this at least one first edge 604.

Figure 7A:
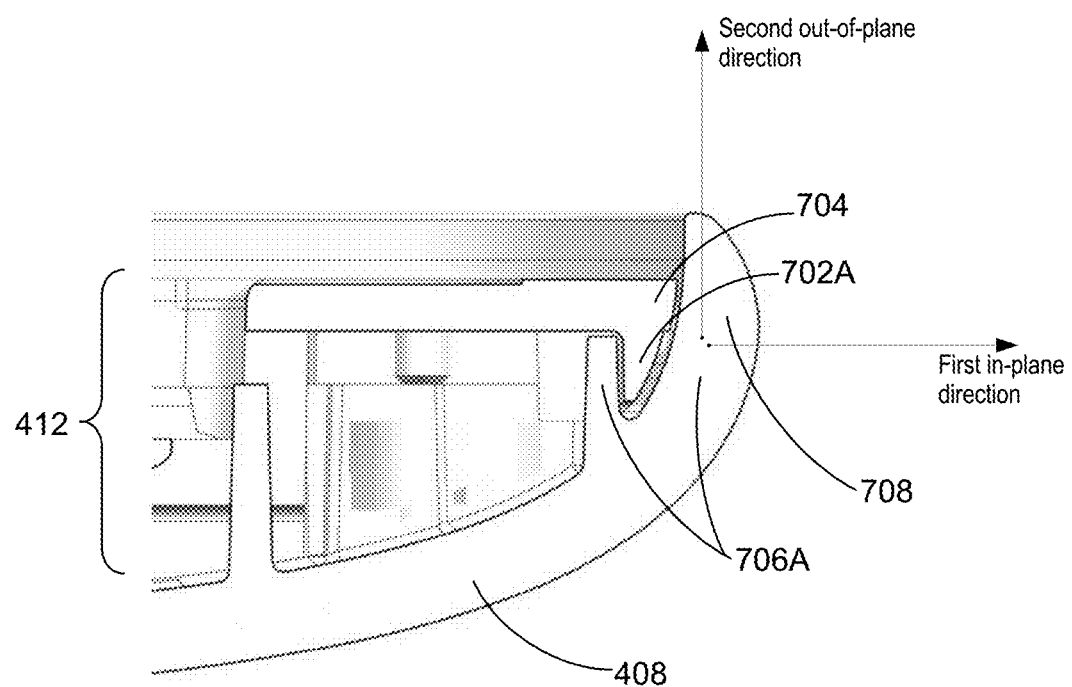
FIGS. 7A and 7B are cross sectional views of example edges of a display assistant device that are configured to limit an in-plane displacement for corresponding edges of a back cover in accordance with some implementations.
Figure 7B:
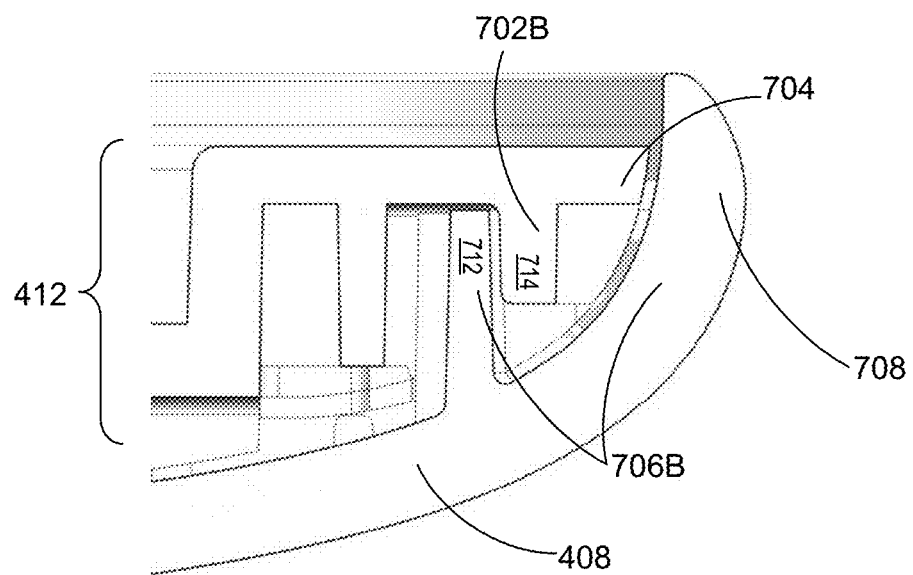
Figure 8A:
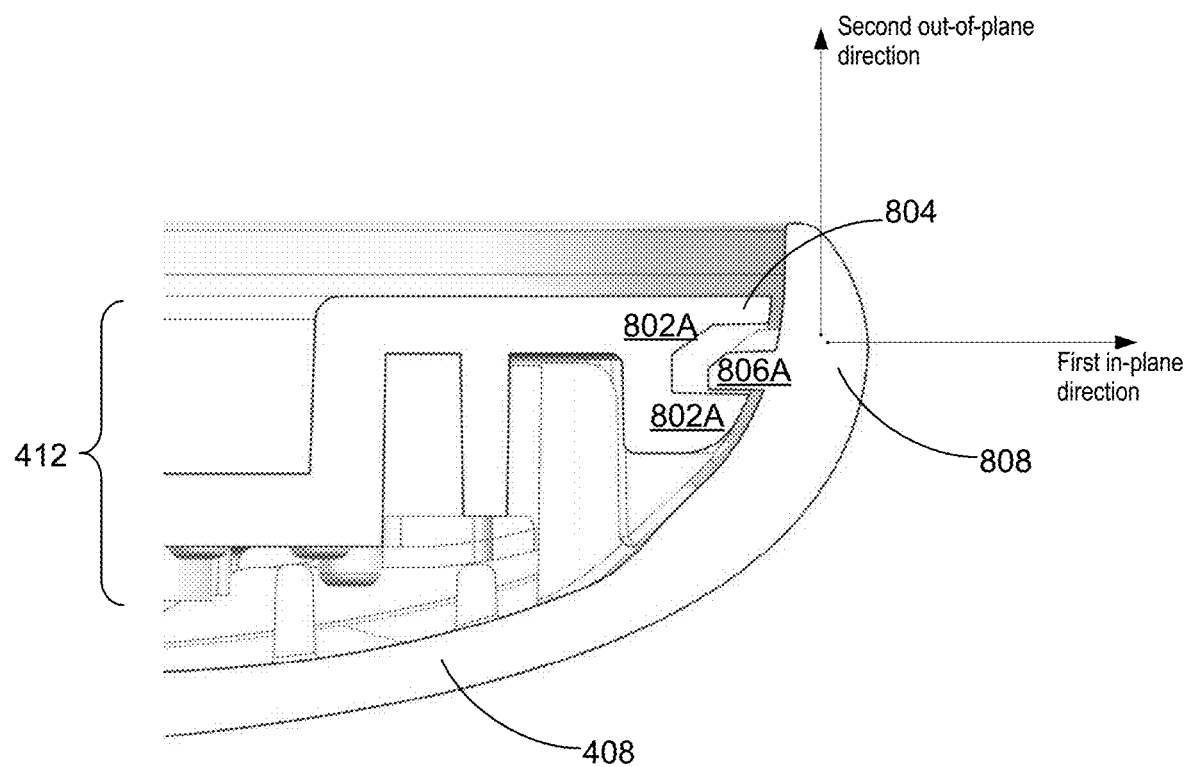
FIGS. 8A-8D are cross sectional views of example edges of a display assistant device that are configured to limit an out-of-plane displacement for corresponding edges of a back cover in accordance with some implementations.
Figure 8B:
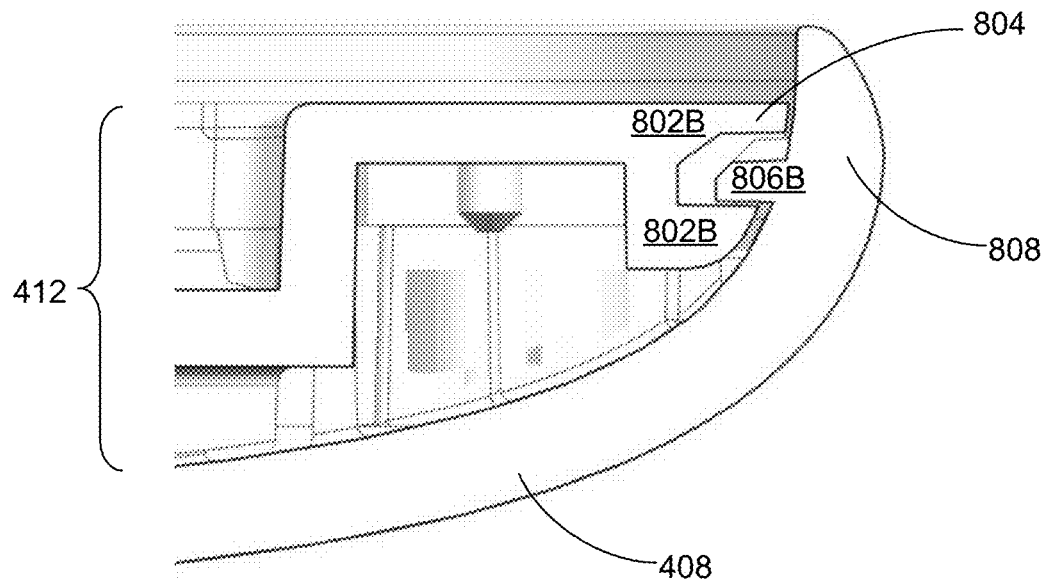
Figure 8C:
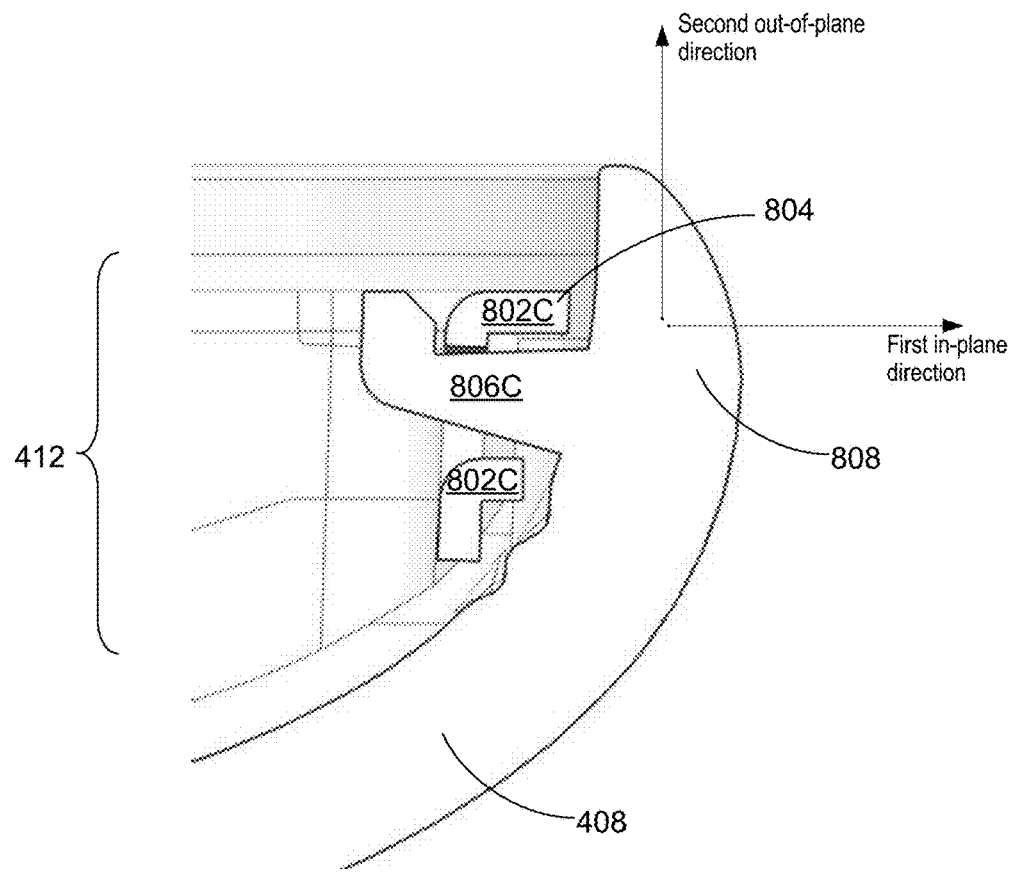
Figure 8D:
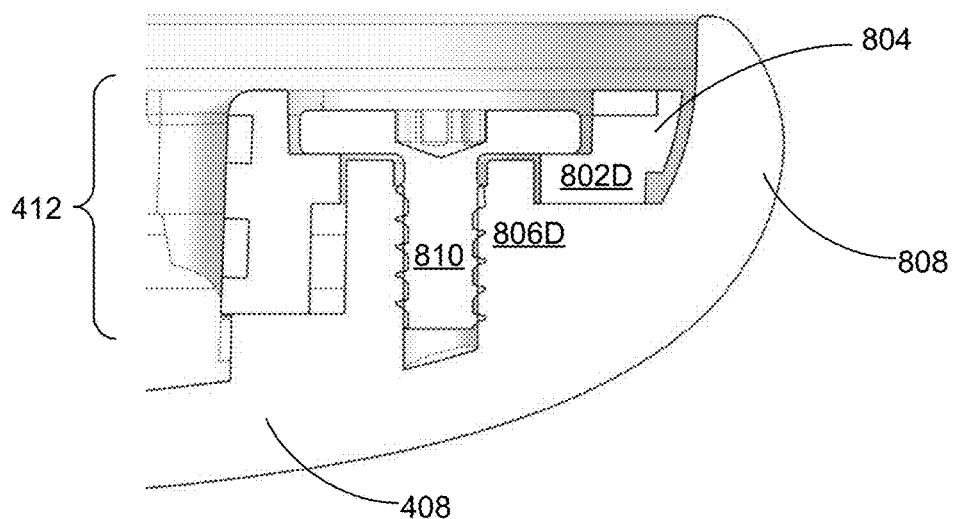

FIGS. 7A and 7B are cross sectional views of example edges 700 of a display assistant device 200 that are configured to limit an in-plane displacement for corresponding edges of a back cover 408 in accordance with some implementations. The display assistant device 200 includes a display panel assembly 412 having a first edge 704 and a first retention element 702. The first retention element 702 is formed on a rear surface of the display panel assembly 412 and adjacent to the first edge 704 of the display panel assembly 412. The back cover 408 of the display assistant device 200 has a second edge and a second retention element 706, and is configured to hold the display panel assembly 412 around the first edge 704 of the display panel assembly 412. The second edge 708 of the back cover 408 rises above the first edge 704 of the display panel assembly 412, e.g., by a substantially small height that is unnoticeable to a user.

The second retention element 706 is arranged adjacent to or on the second edge 708 of the back cover 408, and is complementary to and configured to be mated to the first retention element 702 of the display panel assembly 412. In an example, referring to FIG. 7A, the second retention element 706A includes the second edge 708, and the first retention element 702A is constrained within the second retention element 706. The first retention element 702A can move within the second retention element 706 with a small in-plane displacement that is controlled within a predefined safe displacement range. As such, the first and second retention elements 702A and 706A are configured to control an in-plane displacement of the second edge 708 of the back cover 408 in response to an impact of a force on the second edge 708, thereby limiting an out-of-plane displacement of the second edge 708 of the back cover 408 and protecting the first edge 704 of the display panel assembly 412 from falling apart from the second edge 708 of the back cover 408.

In another example, referring to FIG. 7B, the second retention element 706B also includes the second edge 708 and one or more raised structure 712 configured to rise in an area adjacent to the second edge 708. The first retention element 702B of the display panel assembly 412 also includes one or more raised structures 714 configured to drop from an area adjacent to the first edge 704. The raised structures 714 and 712 of the first and second retention elements 702B and 706B are interweaved with each other, thereby limiting the in-plane displacement of the second edge 708 of the back cover 408 in response to an impact of a force on the second edge 708. In some implementations, FIG. 7B is a cross section of retention elements shown in FIG. 6E, wherein raised structures 712 and 714 correspond to an arm of a T shape and an extended portion 612A or 612B of the display panel assembly 412, respectively.

As shown in FIG. 5B, in addition to the retention elements (e.g., 612 and 616 in FIGS. 6E and 6F, 702 and 706 in FIGS. 7A and 7B), the display assistant device 200 further includes fastener structures configured to limit an out-of-plane displacement of each of the plurality of second edges of the back cover 408 of the display assistant device 200. FIGS. 8A-8D are cross sectional views of example edges 800 of a display assistant device 200 that are configured to limit an out-of-plane displacement for corresponding edges of a back cover 408 in accordance with some implementations. A display panel assembly 412 of the display assistant device 200 includes a first fastener structure 802 disposed adjacent to or on a first edge 804, and the back cover 408 includes a second fastener structure 806 adjacent to a second edge 808. The second fastener structure 806 is complementary to and configured to be mated to the first fastener structure 802 of the display panel assembly 412 for holding the display panel assembly 412 onto the back cover 408 along a second out-of-plane direction.

In some implementations (FIGS. 8A and 8B), the first fastener structure 802A or 802B includes two fingers extended towards a second edge 808 of the back cover 408, and these two fingers optionally includes an end tip of the first edge 804. The second fastener structure 806A or 806B includes a finger extended towards the first edge 804 of the display panel assembly 412. When the first and second fastener structures are mated to each other, the finger of the second fastener structure 806A or 806B is constrained between the two fingers of the first fastener structure 802A or 806B, respectively, such that a displacement of the second edge 808 of the back cover 408 is limited at the second out-of-plane direction. The first fastener structures 802A and 802B are placed at different locations on first edges of the display panel assembly 412. For example, the first fastener structures 802A and 802B are placed adjacent to a right edge and a top edge of the display panel assembly 412, respectively.

Further, in some implementations (FIG. 8C), the finger of the second fastener structure 806C is bent at its tip end. When the first and second fastener structures 802C and 806C are mated to each other, the finger of the second fastener structure 806C is constrained between the two fingers of the first fastener structure 802C, and the tip end of the second fastener structure 806C at least partially limits both a first in-plane displacement and a second out-of-plane displacement of the second edge 808 of the back cover 408 with respect to the display panel assembly 412. Referring to FIG. 5B, in some implementations, the first and second fastener structures 802C and 806C (i.e., in any of elements 512, 514 and 516 in FIG. 5B) are applied to couple the back cover 408 to an edge of the middle frame 406 having a metal insert 418, and the tip end that has been bent can fit into the void area 416 automatically.

In some implementations (FIG. 8D), the first fastener structure 802D of the display panel assembly includes a recess and a first screen hole formed at a bottom of the recess, and the second fastener structure 806D includes a second screen hole formed adjacent to the second edge 808 of the back cover 408. When the first and second fastener structures are mated to each other, the first screen hole and the second screen hole are aligned, and a third fastener structure 810 (e.g., a screw) is placed into the recess of the first fastener structure 802D, enters the first holes of the first fastener structure 802D, and couples to the second screw hole of the second fastener structure 806D. When the screw is tightened to the second screw hole, a screw head of the screw sits in the recess of the first fastener structure 802D, and optionally, a height of the screw head is less than a depth of the recess so that the screw does not protrude beyond the recess. The first and second fastener structures 802D and 806D limit both an in-place displacement and an out-of-plane displacement of the second edge 808 of the back cover 408 with respect to the display panel assembly 412.

Referring to FIG. 5B, examples of the first and second fastener structures 802D and 806D include structures 526A-526I. Optionally, when the first and second fastener structures 802D and 806D are applied to couple the edges of the display panel assembly 412 and the back cover 408, the display panel 404 and the cover glass 402 are assembled to the middle frame 406 after the middle frame 406 is coupled to the back cover 408 via the first and second fastener structures 802D and 806D.

It is noted that in some implementations, an edge of a display panel assembly or a back cover may be narrowly interpreted as an end tip of the display panel assembly or back cover. In some implementations, an edge of a display panel assembly or a back cover may also be broadly interpreted to include the end tip of the display panel assembly or back cover and an area adjacent to the end tip.

In accordance with various implementations of this application, a display assistant device includes a display panel assembly and a back cover. The display panel assembly has a plurality of first edges and a plurality of first retention elements. Each first retention element is formed on a rear surface of the display panel assembly and adjacent to a corresponding first edge of the display panel assembly. The back cover has a plurality of second edges and a plurality of second retention elements and is configured to hold the display panel assembly around the plurality of first edges of the display panel assembly. The plurality of second edges of the back cover rise above the plurality of first edges of the display panel assembly. In some implementations, the plurality of second edges of the back cover rise above the plurality of first edges of the display panel assembly by a substantially small height that is unnoticeable to a user. Each second retention element is arranged adjacent to a corresponding second edge of the back cover, and is complementary to and configured to be mated to one of the plurality of first retention elements of the display panel assembly. When mated to each other, the plurality of first and second retention elements are configured to control an in-plane displacement of each second edge of the back cover in response to an impact of a force on the plurality of second edges of the back cover, thereby limiting an out-of-plane displacement of each second edge of the back cover and protecting the first edges of the display panel assembly from falling apart from the second edges of the back cover.

In some implementations, when mated to each other, the plurality of first and second retention elements are configured to control the in-plane displacement of each second edge of the back cover within a predefined safe displacement range. The in-plane displacement of each second edge of the back cover is along a first in-plane direction that is substantially parallel to a surface of the display panel assembly. The out-of-plane displacement of each second edge of the back cover is along a second out-of-plane direction that is perpendicular to the surface of the display panel assembly. Further, in some implementations, the plurality of first and second retention elements are configured to be mated to each other when the back cover is moved towards and assembled to the display panel assembly along a third direction that is opposite to the second out-of-plane direction and perpendicular to the first in-plane direction. Each of the plurality of first retention elements is not held to a corresponding second retention element at the second out-of-plane direction using any mechanical feature of the respective first and second retention elements.

In some implementations, the display panel assembly includes a display panel that is configured to display graphics content, and the display panel is substantially flat. Further, in some implementations, the display panel assembly includes a middle frame attached to a rear surface of the display panel, and the middle frame provides the rear surface of the display panel assembly on which the plurality of first retention elements are formed.

In some implementations, each of the plurality of second retention elements has a T shape lying on a front surface of the back cover and having a leg and two arms, the leg being anchored near one of the plurality of second edges of the back cover and extending away from the respective second edge. A first retention element mated to the respective second retention element has two extended portions configured to hold behind two extended arms of the T shape, thereby controlling the in-plane displacement of the respective second edge of the back cover. Further, in some implementations, the respective first and second retention elements that are mated to each other are configured to control the in-plane displacement of the corresponding second edge of the back cover within a predefined safe displacement range. The predefined safe displacement range is defined partially by a length of the leg of the T shape.

In some implementations, the plurality of first edges include all four peripheral edges of the display panel assembly, and the plurality of first retention elements include one or more first retention elements placed adjacent to each of the plurality of first edge of the display panel assembly. Further, in some implementations, the one or more first retention elements placed adjacent to one of the first edges are distributed evenly along the one of the first edges. Additionally, in some implementations, wherein the one or more first retention elements placed adjacent to one of the first edges include at least one first retention element placed adjacent to a middle point of the one of the first edges.

In some implementations, the force impacting the plurality of second edges of the back cover complies with a panel protection standard that requires protection of the first edges of the display panel assembly from falling apart from the second edges of the back cover when the display assistant device hits a ground after a free fall of a predetermined height. In some implementations, the force impacting the plurality of second edges of the back cover has an upper limit that is determined based on a weight of the display assistant device and an impact angle of the force associated with a worst situation.

In some implementations, the display panel assembly includes a plurality of first fastener structures disposed adjacent to or on the plurality of first edges, and the back cover includes a plurality of second fastener structures. Each second fastener structure is complementary to and configured to be mated to one of the plurality of first fastener structures of the display panel assembly for holding the display panel assembly onto the back cover.

In some implementations, the back cover is fastened to a base, and a speaker assembly (e.g., 302 in FIG. 3) is disposed in a lower portion of the base to lower down a center of mass of the display assistant device. Further, in some implementations, the display panel assembly is supported by the base at a rear surface of the back cover. The display panel assembly faces substantially forward and leans slightly backward by a screen angle, and the base leans backward by a base angle that is opposite to the screen angle with respect to an axis that is perpendicular to a surface on which the display assistant device is configured to sit.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An electronic device comprising:
a display panel assembly comprising:
   a first edge;
   a rear surface; and
   a first retention element disposed on the rear surface and adjacent to the first edge; and
a back cover configured to mate with the display panel assembly, the back cover comprising:
   a second edge configured to rise above the first edge when the back cover is mated to the display panel assembly;
   a second retention element disposed adjacent to the second edge, the second retention element configured to mate with the first retention element and, when mated with the first retention element:
      allow for an in-plane displacement of the display panel assembly relative to the back cover within a predefined safe displacement range; and
      limit an out-of-plane displacement of the display panel assembly relative to the back cover,
wherein:
   the second retention element is configured as a T-shaped structure, the T-shaped structure is disposed on a front surface of the back cover and has a leg and two arms, the leg is anchored near the second edge, the leg extends away from the second edge, and the first retention element has two extended portions configured to be disposed between the two arms of the T-shaped structure and the second edge; or
   the first retention element is configured as a T-shaped structure, the T-shaped structure has a leg and two arms, the leg is anchored near the first edge, the leg extends away from the first edge, and the first retention element has two extended portions configured to be disposed between the two arms of the T-shaped structure and the first edge.

2. The electronic device of claim 1, wherein the out-of-plane displacement of the display panel assembly relative to the back cover is in a direction opposite a mating direction between the back cover and the display panel assembly.

3. The electronic device of claim 1, wherein the display panel assembly further comprises a flat display panel configured to display graphics content.

4. The electronic device of claim 1, wherein:
the display panel assembly further comprises a middle frame; and
the rear surface is a surface on the middle frame.

5. The electronic device of claim 1, wherein the second edge is further configured to wrap around the first edge when the back cover is mated to the display panel assembly.

6. The electronic device of claim 1, wherein:
the display panel assembly further comprises other first edges with corresponding first retention elements; and
the back cover further comprises other second edges with corresponding second retention elements.

7. The electronic device of claim 1, wherein:
the display panel assembly further comprises a plurality of first edges and corresponding first retention elements; and
the back cover further comprises a plurality of second edges and corresponding second retention elements.

8. The electronic device of claim 1, wherein:
the in-plane displacement of the display panel assembly relative to the back cover is in a direction parallel to a surface of the display panel assembly; and the out-of-plane displacement of the display panel assembly relative to the back cover is in a direction perpendicular to the surface of the display panel assembly.

9. The electronic device of claim 8, wherein the direction of the in-plane displacement of the display panel assembly relative to the back cover is away from a centroid of the back cover.

10. The electronic device of claim 1, wherein the first retention element is disposed adjacent to a middle point of the first edge.

11. The electronic device of claim 10, wherein the first retention element is one of a plurality of first retention elements adjacent to the first edge.

12. The electronic device of claim 1:
further comprising a base with a bottom surface configured to sit on a surface;
wherein the back cover is fastened to the base; and
the base comprises a speaker assembly disposed in a lower portion of the base.

13. The electronic device of claim 12, wherein:
the display panel assembly is slanted at a screen angle relative to the bottom surface; and
the base is slanted at a base angle relative to the bottom surface.

14. The electronic device of claim 1, wherein the predefined safe displacement range is based on a length of the leg of the T-shaped structure.

15. The electronic device of claim 1, wherein the in-plane displacement of the display panel assembly relative to the back cover is based on a force impacting the second edge, the force corresponding to an impact standard.

16. The electronic device of claim 15, wherein the force is based on a weight of the electronic device.

17. The electronic device of claim 16, wherein the force is based on a fall situation and has a corresponding angle relative to the second edge.

18. The electronic device of claim 17, wherein the angle corresponds to a worst-case fall scenario for the display panel assembly separating from the back cover.

19. An electronic device comprising:
a display panel assembly comprising:
a first edge;
a rear surface;
a first retention element disposed on the rear surface and adjacent to the first edge; and
a first fastener structure disposed on the rear surface and adjacent to the first edge; and
a back cover configured to mate with the display panel assembly, the back cover comprising:
a second edge configured to rise above the first edge when the back cover is mated to the display panel assembly;
a second retention element disposed adjacent to the second edge, the second retention element configured to mate with the first retention element and, when mated with the first retention element, allow for:
an out-of-plane displacement of the display panel assembly relative to the back cover; and
an in-plane displacement of the display panel assembly relative to the back cover within a predefined safe displacement range; and
a second fastening structure disposed adjacent to the second edge, the second fastening structure configured to mate with the first fastener structure on the rear surface of the display panel assembly and, when mated with the first fastener structure:
allow for the in-plane displacement of the display panel assembly relative to the back cover within the predefined safe displacement range; and
limit the out-of-plane displacement of the display panel assembly relative to the back cover,
wherein:
the second retention element is configured as a T-shaped structure, the T-shaped structure is disposed on a front surface of the back cover and has a leg and two arms, the leg is anchored near the second edge, the leg extends away from the second edge, and the first retention element has two extended portions configured to be disposed between the two arms of the T-shaped structure and the second edge; or
the first retention element is configured as a T-shaped structure, the T-shaped structure has a leg and two arms, the leg is anchored near the first edge, the leg extends away from the first edge, and the first retention element has two extended portions configured to be disposed between the two arms of the T-shaped structure and the first edge.

20. The electronic device of claim 19, wherein the predefined safe displacement range is based on a length of the leg of the T-shaped structure.

* * * * *